May 27, 1952     F. H. BAILLY     2,598,096
VEHICLE POSITION INDICATOR
Filed July 18, 1949     2 SHEETS—SHEET 1
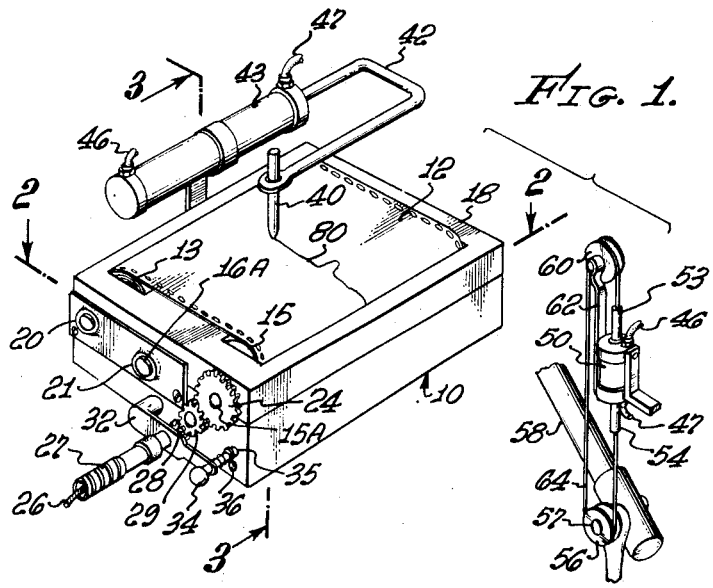
FIG. 1.
FIG. 2.
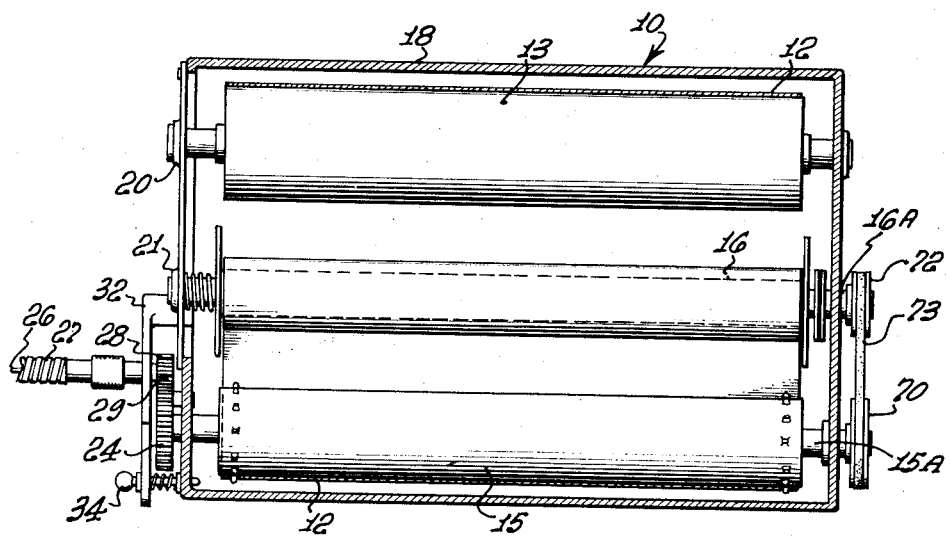
FLORENT H. BAILLY,
INVENTOR.
BY *James B. Christie*
ATTORNEY.

May 27, 1952 — F. H. BAILLY — 2,598,096
VEHICLE POSITION INDICATOR
Filed July 18, 1949 — 2 SHEETS—SHEET 2
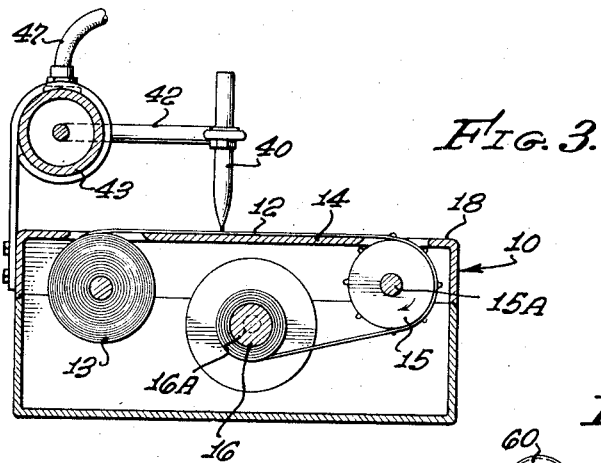
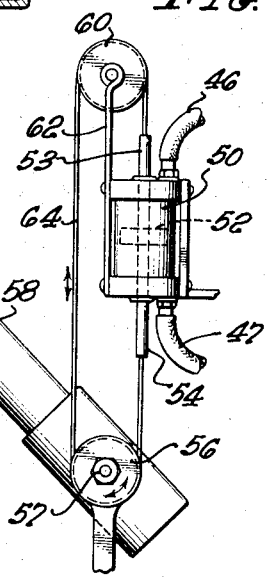
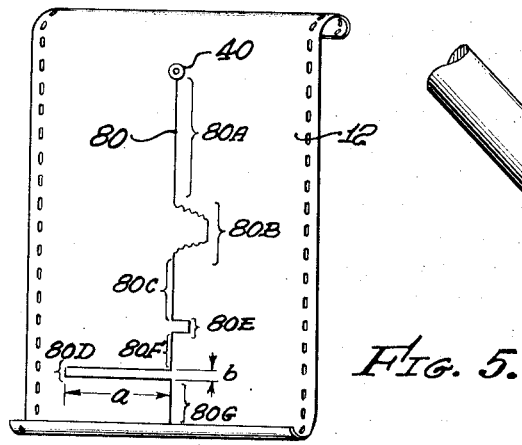
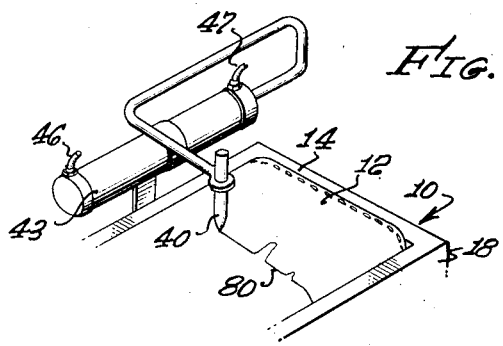
FLORENT H. BAILLY,
INVENTOR.
BY
ATTORNEY.

Patented May 27, 1952

2,598,096

UNITED STATES PATENT OFFICE 2,598,096

VEHICLE POSITION INDICATOR

Florent H. Bailly, Pasadena, Calif.

Application July 18, 1949, Serial No. 105,405

5 Claims. (Cl. 346—8)

This invention relates to measuring apparatus and more particularly to a surveying aid for use in vehicular surveys or mapping.

In making geological or mineralogical surveys, topographical maps, etc., the general practice is to locate a few reference points with considerable accuracy and to fill in intervening data with somewhat less accuracy. For example, in making a geological, magnetometric or gravimetric survey, the survey is generally begun from a reference point determined with considerable accuracy. Or the survey may be made between two known reference points. However, readings obtained between such fixed reference points are usually mapped by estimating, pacing, or otherwise approximating the location of the particular reading with respect to these reference points. In some areas surveys of this type may be made with vehicle borne magnetometers, gravitometers, altimeters, radiation detectors, etc. Vehicular surveys are considerably faster than foot surveys and are employed in preference to foot surveys wherever the terrain permits. However, it is quite difficult to correlate the excursions of a vehicle in which a magnetometer, for example, is mounted with the several readings obtained from the magnetometer and with respect to the known reference points.

If it were possible to conduct such a vehicular survey by traveling in a straight line between two reference points, there would be no serious problem of correlation. However, where deviations from such a straight course are dictated either by the contour of the terrain under investigation or for the purpose of investigating anomalies in the function being measured, there is no convenient means available for automatically logging the approximate bearing and range of the vehicle with respect to the reference points. We have now developed such an automatic logging system by means of which vehicular surveys are accordingly facilitated.

The apparatus of the invention comprises a recorder including a driven chart and a pen contacting the chart to give a continuous record of the distance traveled and the deviations of the vehicle in conducting a survey from a known base or reference point. In the apparatus the chart is driven at a speed proportional to the speed of the vehicle by suitable mechanical linkage between the vehicle and a chart drive roller. The pen is fixed with respect to movement in the direction of the longitudinal axis of the chart but is movable laterally with respect to the chart. Lateral displacement of the pen is responsive to and proportional to any turn of the vehicle so that deviations of the pen and hence the recorded trace from a straight base line are indicative of a change of bearing of the vehicle.

Conveniently, the chart is driven by a sprocket type drive roller connected through a suitable speed reduction gear train to a cable driven by the speedometer gears on the vehicle drive shaft. The speed reduction achieved by the gear train can be selected as desired, say for example, one inch of chart travel corresponds to 100 yards of vehicle travel. The position of the pen on the chart is conveniently determined by a hydraulic system transmitting the rotation of the pitman pin in the vehicle steering assembly to lateral displacement of the pen.

Starting at a fixed reference point determined from a map, a vehicle borne survey can be made rapidly and with sufficient accuracy without the use of plane table, transits, etc. As each survey reading is taken, geological or geophysical observations, such as dip, strike, etc., can be noted on the chart together with any other notes of the nature of the terrain, etc. By making such notations at the point of the trace representative of the location of the vehicle where the reading is taken, the chart may be interpreted, after the survey is made, and the various readings may be plotted on a map of the area. The accuracy of the instrument and this method of surveying are sufficiently high to permit reproduction of the results and return to the location of any anomalous reading or series of readings by following a course thus plotted.

The invention will be more clearly understood with reference to the following detailed description thereof taken in relation to the accompanying drawing in which:

Fig. 1 is a perspective view of the apparatus of the invention with remote parts brought in juxtaposition for purposes of illustration;

Fig. 2 is a horizontal section taken on the line 2—2 of Fig. 1;

Fig. 3 is a vertical section taken on the line 3—3 of Fig. 1;

Fig. 4 is an enlargement of a portion of the apparatus of Fig. 1;

Fig. 5 shows a section of the chart as it appears after a survey has been made; and Fig. 6 is a perspective view showing a modified form of pen supporting arm.

Referring to Figs. 1 through 4, the apparatus of the invention comprises a case 10 housing a strip chart 12. The chart 12 is fed from a feed roller 13 across a platen 14 forming the upper surface of case 10, over a drive roller 15 and on to a reroll roller 16. Conveniently, an upper section 18 of the housing is separate from the lower portion so that it may be removed while replacing charts, etc. If desired the two parts of the housing may be hinged together. Drive roller 15 is journaled in this upper portion. The chart is perforated along its longitudinal edges, the perforations being engaged by sprockets on the drive roller 15. The feed roller 13 and reroll roller 16 are journaled on spring-loaded bearings 20, 21 so that both rollers may be withdrawn from the case by releasing the bearings 20 and 21.

A spur gear 24 is mounted on one outer end of axle 15A of drive roller 15. A drive cable 26 is connected to the speedometer gears (not shown) on a vehicle drive shaft in the manner of a conventional speedometer and is led through a flexible conduit 27 to the case 10. A spur gear 28 is mounted on the casing end of the cable 26 and is adapted to mesh with an idler gear 29 through which rotation of cable 26 is transmitted to the drive gear 24 on the drive roller.

A simplified clutch mechanism is provided for engaging and disengaging the cable gear 28 with idler gear 29. The clutch mechanism comprises an arm 32 pivoted at one end to the case 10 and provided at the opposite end with a spring loaded set pin 34. Two holes 35 and 36 are provided in the case on the radius of rotation of the set pin. The conduit 27 which carries the drive cable 26 is mounted through the center portion of the pivot arm 32 so that rotation of the arm engages or disengages the spur gear 28 with gear 29. As shown in Fig. 1, with the set pin 24 inserted in the upper hole 35 in the case, gear 28 is meshed with gear 29. With set pin 34 inserted in the lower hole 36, gear 28 does not mesh with gear 29. In this condition vehicle travel will not produce any chart travel.

A pulley 70 is mounted on the end of the drive roller axle 14A opposite spur gear 24. A pulley 72 is mounted on the same end of axle 16A of reroll roller 16. A belt 73 is mounted around pulleys 70 and 72 so that the reroll roller 16 will be positively driven responsive to the rotation of the drive roller 15. Since the speed of rotation of the reroll roller must vary in relation to the effective diameter of the chart rolled thereon, the belt 73 is made relatively loose on the pulleys 70, 72 to permit slippage. Thus as the chart is wound on the reroll roller 16 increasing the effective diameter thereof, the speed of rotation of the reroll roller relative to the speed of rotation of the drive roller will decrease. This can be taken care of by slippage of belt 73 as described.

A pen 40 is supported above and in contact with the upper face of chart 12 by means of a U-shaped arm 42. The arm 42 is journaled through one end of a cylinder 43 which is rigidly affixed to the back of case 10 with the longitudinal axis of the cylinder transverse to the longitudinal axis of the chart. A piston 44 is fastened on the inner end of arm 42 and is slidable within the cylinder 43. Cylinder 43 is connected by fluid flow lines 46, 47 opening into opposite ends of the cylinder with a second cylinder 50 conveniently mounted in proximity to the steering assembly of the vehicle. The fluid flow lines 46, 47 also open into opposite ends of the cylinder 50. A piston 52 is mounted within cylinder 50 and is connected to shafts 53, 54 journaled through opposite ends of the cylinder 50. A pulley 56 is mounted on the pitman pin 57 at the lower end of steering column 58 of the vehicle in such fashion that the pulley 56 will rotate responsive to rotation of the steering column; i. e. responsive to and in proportion to any turn of the vehicle. A second pulley 60 is rigidly and rotatably supported above the cylinder 50 on a shaft 62 affixed to and projecting above cylinder 50. A cable 64 is carried over pulleys 56 and 60 and affixed at its opposite ends to the shafts 53, 54. The system including cylinder 43, cylinder 50 and fluid flow lines 46 and 47 are filled with a suitable hydraulic fluid. Rotation of pulley 56 responsive to rotation of steering column 58 causes displacement of piston 52 in cylinder 50 which by displacement of the hydraulic fluid produces a proportional displacement of piston 44 in cylinder 43. Displacement of piston 44 produces a corresponding lateral displacement of pen 40 on the chart 12.

The arm 42 is conveniently made so as to be free to pivot about the longitudinal axis of the cylinder 43 so that the pen may be lifted clear of the chart to facilitate removal of the latter. Also the arm may be constructed to lie in a vertical plane passing through the longitudinal axis of the cylinder 43. In such case a goose neck is provided on the outer end of the arm to support the pen above the chart. Such construction is shown in Fig. 6 and has the advantage of providing freer access to the chart for making notes thereon beside the pen.

The operation of the apparatus of the invention is completely automatic and is as follows:

With the drive cable 26 connected to the drive roller 15 through gears 28, 29 and 24 as shown in Fig. 1 the chart will travel from feed roller 13 around the drive roller 15 and on to the reroll roller 16 at a speed proportional to the speed of the vehicle. The ratio of chart travel to vehicle travel may be pre-selected as desired by appropriate selection of the power transmission gears.

Referring to Fig. 5 which shows a section of chart 12, as the vehicle proceeds in a straight course pen 40 will trace a straight line as for example the section 80A of trace 80. When the vehicle is turned, the pen will move laterally on the chart a distance proportional to the degree of turn of the vehicle. If, as is conventional practice, the radius of turn of the vehicle is progressively decreased through the course of a given angle of turn, is then held at a given angle of turn and is subsequently returned to a straight course through a progressively increasing radius of turn, the effect of the turn will show up on trace 80 as a peak of the type of 80B. The straight section of the top of the peak 80B indicates the period in which a constant radius of turn was maintained. Returning to base line 80C, this section of the trace indicates a return to straight travel but in a direction differing from that represented by section 80A of the trace. The direction in which the vehicle is traveling while making the trace 80C can be calculated from the deviation 80B based on the magnitude and duration of the deflection. For example, the section 80D of the trace indicates a much sharper turn than section 80B since the magnitude (a) of deflection is greater. But since the duration of the turning interval represented by the function (b) is considerably less than the turning interval represented by the section 80B of the trace, the overall change in bearing represented by the trace 80D may be considerably less than that represented by the trace 80B. The direction of the trace deflection, i. e. toward the right or left of the base line, indicates the direction of bearing change of the vehicle. For example, if vehicle travel represented by the section 80A of the trace is due north, the deviation indicated by the section 80B may be, say 40° east of north. Then the section 80C will indicate a given distance of travel in this 40° easterly direction. The deviation 80E on the trace may indicate another 10° easterly turn in which case the section 80F of the trace indicates the distance of travel in the new direction, i. e. 50° east of north. The deflection 80D being in the opposite direction indicates a reverse turn, as for example, 30 back towards north in which case the section 80G of the chart gives the distance of travel 20 east of north. In this fashion, the entire course of the vehicle is plotted on the chart and may be calculated therefrom.

By placing instrument readings or other comments on the chart adjacent the point of the trace representing the location of the vehicle at the moment the reading is taken, the exact location of the point of reading may be calculated from the chart with reference to the starting position at a given base point. Moreover, the information appearing on the chart may be transposed to a map of the survey area. If the map is chosen to have the same scale as the chart, the transposition may be accomplished in part by direct tracing or by means of a pantograph, etc. The trace on the chart may be directly reproduced on the map by altering the orientation of the chart to correspond to the indicated changes in direction. In this manner the trace reproduced on the map will automatically follow the bearing and range of the vehicle and instrument readings and other notations originally noted on the chart may be transferred to the map.

I claim:

1. Surveying apparatus for use in vehicular surveys comprising a housing, a strip chart mounted in the housing, means for causing the chart to travel between two rollers in the housing at a rate proportional to the speed of the vehicle, a first cylinder mounted to the housing, a first piston oscillatable in the cylinder, an arm affixed to the piston and extending through an end of the first cylinder, the outer end of the arm being bent to project over the chart, a pen mounted in the arm and adapted to mark on the chart, a second cylinder mounted to the vehicle adjacent the steering column thereof, a second piston oscillatable in the second cylinder, two piston rods mounted to the second piston and extending through opposite ends of the second cylinder, a first pulley mounted to the pitman pin of the vehicle steering assembly, a second pulley spaced from the first pulley, a cable looped over the two pulleys, the opposite ends of said cable being affixed to the two piston rods so that rotation of the first pulley displaces the second piston in the second cylinder, a first fluid flow line connecting one end of the first cylinder to one end of the second cylinder, a second fluid flow line connecting the other end of the first cylinder to the other end of the second cylinder, the two cylinders and the fluid flow lines being filled with a hydraulic fluid so that displacement of the second piston in the second cylinder produces proportionate displacement of the first piston in the first cylinder.

2. Apparatus according to claim 1 wherein the first cylinder is of smaller diameter than the second cylinder so that displacement of the piston in the second cylinder produces a correspondingly greater displacement of the piston in the first cylinder.

3. Surveying apparatus for use in a vehicle comprising a housing, a movable chart mounted in the housing, means for causing the chart to move in the housing at a rate proportional to the speed of the vehicle, a first cylinder mounted in fixed relationship with respect to the housing, a piston located in the first cylinder, an arm affixed to the piston and extending through an end of the first cylinder over the chart, means secured to the arm for marking on the chart, a second cylinder mounted on the vehicle, a piston located in the second cylinder, means coupled to the steering mechanism of the vehicle for moving the piston along the second cylinder in accordance with turning of the vehicle and in proportion to the angle of turn of the vehicle, a first fluid flow line connecting one end of the first cylinder to one end of the second cylinder, and a second fluid flow line connecting the other end of the first cylinder to the other end of the second cylinder.

4. In surveying apparatus for use in a vehicle having a housing, a movable chart mounted in the housing, means for causing the chart to move in the housing at a rate proportional to the speed of the vehicle, and means for marking on the chart, the improvement comprising hydraulic means having a movable piston coupled to the marking means for causing the marking means to move normal to the direction of movement of the chart in response to displacements of the piston, and means connected to the pitman pin of the steering assembly of the vehicle and to the hydraulic means for causing said piston to move in accordance with the direction of movement of the steering assembly of the vehicle and in proportion to the angle of turn of the vehicle.

5. Surveying apparatus for use in a vehicle comprising a cylinder affixed to the vehicle adjacent the steering column thereof, a piston located in the cylinder, a piston rod affixed to the piston and extending through each end of the cylinder, a first pulley affixed to the pitman pin of the vehicle steering assembly, a second pulley affixed to the vehicle and spaced from the first pulley, a cable looped over the two pulleys and having its ends attached to the two ends of the piston rod so that rotation of the first pulley displaces the piston in the cylinder, a strip chart mounted in a housing located in the vehicle, means for causing the chart to move in the housing at a rate proportional to the speed of the vehicle, means for marking on the chart, and hydraulic means coupled to the marking means and to said cylinder for causing the marking means to move transversely with respect to the direction of movement of the chart in response to movement of the piston in said cylinder.

FLORENT H. BAILLY.

REFERENCES CITED

The following references are of record in the file of this patent:

UNITED STATES PATENTS

| Number | Name | Date |
|---|---|---|
| 1,097,378 | Thompson, Jr. | May 19, 1914 |
| 1,113,747 | Boyden | Oct. 13, 1914 |
| 1,716,121 | Giffen | June 4, 1929 |
| 1,728,904 | Herr | Sept. 17, 1929 |
| 1,790,243 | Nilson | Jan. 27, 1931 |
| 1,935,004 | Winther | Nov. 14, 1933 |
| 2,149,440 | Jackson | Mar. 7, 1939 |